(12) United States Patent
Bell et al.

(10) Patent No.: US 7,418,342 B1
(45) Date of Patent: Aug. 26, 2008

(54) AUTONOMOUS DESTINATION DETERMINATION

(75) Inventors: David R. Bell, Southampton (GB); Philip Norton, Bishopstoke (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/949,150

(22) Filed: Dec. 3, 2007

(51) Int. Cl.
*G01C 21/34* (2006.01)

(52) U.S. Cl. .................... 701/213; 340/995.19

(58) Field of Classification Search ............... 701/213, 701/201, 202, 203, 209; 340/988, 989, 990, 340/995; 370/351
See application file for complete search history.

(56) References Cited

U.S. PATENT DOCUMENTS

| | | | |
|---|---|---|---|
| 3,860,791 A | 1/1975 | Headle, Jr. | |
| 3,925,641 A | 12/1975 | Kashio | |
| 4,982,332 A | 1/1991 | Saito et al. | |
| 5,031,104 A | 7/1991 | Ikeda et al. | |
| 5,919,246 A * | 7/1999 | Waizmann et al. | 701/209 |
| 5,978,730 A | 11/1999 | Poppen et al. | |
| 6,023,653 A | 2/2000 | Ichimura et al. | |
| 6,026,345 A | 2/2000 | Shah et al. | |
| 6,047,234 A | 4/2000 | Cherveny et al. | |
| 6,236,935 B1 * | 5/2001 | Helmstadter et al. | 701/205 |
| 6,249,241 B1 | 6/2001 | Jordan et al. | |
| 6,356,836 B1 | 3/2002 | Adolph | |
| 6,377,888 B1 | 4/2002 | Olch | |
| 6,421,605 B1 | 7/2002 | Steiner et al. | |
| 6,480,804 B2 * | 11/2002 | Maeda et al. | 702/150 |
| 6,591,188 B1 * | 7/2003 | Ohler | 701/209 |
| 6,801,850 B1 | 10/2004 | Wolfson | |
| 6,898,521 B2 | 5/2005 | Yanai | |
| 6,990,409 B2 | 1/2006 | Khan et al. | |
| 2002/0052786 A1 | 5/2002 | Kim et al. | |
| 2004/0158366 A1 | 8/2004 | Dieterle | |
| 2005/0125148 A1 * | 6/2005 | Van Buer et al. | 701/209 |
| 2008/0027639 A1 * | 1/2008 | Tryon | 701/209 |

FOREIGN PATENT DOCUMENTS

| | | |
|---|---|---|
| EP | 1202234 | 2/2002 |
| EP | 1202234 | 2/2005 |
| JP | 11-213289 | 8/1999 |
| JP | 2003-114130 | 4/2003 |
| JP | 2004-258046 | 9/2004 |

(Continued)

OTHER PUBLICATIONS

Ben-Akiva et al., "Invenstigation of Route Guidance Generation Issues by Simulation with DynaMIT", Transportation and Traffic Theory, Proceedings of the 14th International Symposium on Transportation and Traffic Theory, 1999, pp. 577-600.

(Continued)

*Primary Examiner*—Dalena Tran
(74) *Attorney, Agent, or Firm*—Scully, Scott, Murphy & Presser, P.C.; Scott Roberts

(57) ABSTRACT

A method to autonomously determine a destination in navigation system is disclosed. The system is preconfigured with all the routes that a vehicle takes. The system constantly checks if the vehicle takes known routes. After finding out that the vehicle has been taken a known route, a final destination is determined.

2 Claims, 1 Drawing Sheet

FOREIGN PATENT DOCUMENTS

| | | |
|---|---|---|
| JP | 2004-317302 | 11/2004 |
| WO | WO 01/42739 A1 | 6/2001 |

OTHER PUBLICATIONS

Ben-Akiva et al., "Development of a Route Guidance Generation System For Real-Time Application", Presented at the IFAC Conference, pp. 1-6, no date is available.

Dessouky et al., "Bus Dispatching at Timed Transger Transit Stations Using Bus Tracking Technology", Transportation Research, Part C, 1999, pp. 1-38.

Duckham et al., "'Simples' Paths: Automated Route Selection for Navigation", National Center for Geographic Information and Analysis, pp. 1-18, no date is available.

Fuhrmann et al., "Navigation in Desktop Geovirtual Environments: Usability Assesment", 20th International Cartographic Conference, 2001.

Kanoh et al., "Knowledge Based Genetic Algorithm for Dynamic Route Selection", Institute of Information Sciences and Electronics, no date is available.

Kidono et al., "Autonomous Visual Navigation of a Mobile Robot Using a Human-Guided Experience", vol. 40, Issues 2 & 3, 2002, pp. 121-130.

Mayhew et al., "Multi-rate Sensor Fusion for GPS Navigation Using Kalman Filtering", Master of Science Thesis, 1999, pp. 1-120.

Meyer et al., "Map-based Navigation in Mobile Robots. II. A review of map-learning and path-planning strategies", Elsevier Science, 2003.

Oriolo et al., "Real-Time Map Building and Navigation for Autonomous Robots in Unknown Environments", IEEE Transactions on Systems, Man, and Cybernetics, 1998, pp. 316-333.

Ram et al., "Using Genetic Algorithms to Learn Reactive Control Parameters for Autonomous Robotic Navigation", vol. 2, No. 3, 1994, pp. 277-305.

Vuong et al., "Autonomous Flight Guidance Using The Global Positioning Systems", 2007, pp. 1-7.

Wellington et al., "Learning Predictions of the Load-Bearing Surface for Autonomous Rough-Terrain Navigation in Vegetation", The 4th International Conference on Field and Service Robotics, Jul. 14-16, 2003.

\* cited by examiner

AUTONOMOUS DESTINATION DETERMINATION

BACKGROUND OF THE INVENTION

1. Fields of the Invention

The present invention generally relates to vehicle navigation systems. More particularly, the present invention relates to an enhanced GPS (Global Positioning System)-based vehicle navigation system that autonomously determines a destination location.

2. Description of the Prior Art

There are various GPS-based systems available for tracking vehicle locations, and for providing vehicle navigation routes from the current location to a chosen destination. In these cases, the destination is directly selected. Current systems such as GPS-based navigation systems or other satellite-based navigation systems can also determine the current location of a vehicle. Satellite navigation systems can also store the destination of the vehicle or person but this destination has to be manually entered at the beginning of the journey. Boundary notification is a technique often used in these systems to indicate when a vehicle is within a certain range of its destination. In the boundary notification, a user has to be within some fixed, normally short, distance from destination, to predict the destination.

It would be desirable to provide a method for autonomously determining a destination of a vehicle in a GPS-based system that obviates the need for a user to have to enter destination information each time the user embarks on a journey to the destination, but rather autonomously determine a user's destination.

SUMMARY OF THE INVENTION

The present invention is an autonomous way of determining the end destination of a vehicle-based journey, based on the pattern keys that are entered during a one-time configuration process. That is, a method is provided that enables autonomous destination determination, where a user input is not available. There is no requirement to manually enter a destination, and no need for a central server to process any GPS data; yet, according to the invention, the final destination can be identified as the user is traveling.

The system uses a vehicular and satellite based GPS system and implements map software to autonomously determine a destination. According to the invention, a known route potentially or subsequently to be traveled is described by a number of ordered key locations on that route, creating a pattern key that describes that route. The route a vehicle actually takes can be compared against each defined pattern key. If the vehicle passes through all the locations in a pattern key, then the system concludes that the vehicle has embarked on that known route, and so is heading to the known destination and can be directed to that destination accordingly.

Thus, there is provided a method to autonomously determine a destination of a vehicle employing a GPS-based navigation system comprising: a one-time configuration process and a destination determination process, the one-time configuration process comprising:

(a) inputting one or more routes to be autonomously determined in the system, each route including a starting point and an end point, by entering the starting point and the end point in said GPS-based navigation system;

(b) displaying the route through a map with a series of decision points;

(c) manually selecting a subset of the decision points as close to the starting point as possible to identify a vehicle's movement;

(d) ordering the subset of the decision points;

(e) storing the ordered subset and the end point as a pattern key for the route, the pattern key uniquely identify the route from the starting point to the end point;

(f) repeating (a) (e) for inputting each route to be autonomously determined;

the destination determination process comprising:

(g) continuously comparing a vehicle's current location with each ordered decision point of each pattern key based on the GPS-based navigation system;

(h) if the vehicle's location matches with the decision points of one or more pattern keys, checking if the vehicle passed through all decision points of the pattern keys;

(i) if the vehicle passed through all decision points of a pattern key in the defined order, the end point of the pattern key is dynamically predicted as the vehicle's destination; and (j) returning to step (g).

The primary benefit of the present invention is that no manual intervention is required; the driver of a vehicle does not need to specify a destination in order for a navigation system to work. Autonomous destination means that any vehicle equipped with a OPS tracking vehicle can have its final destination accurately predicted.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

Figure 1:
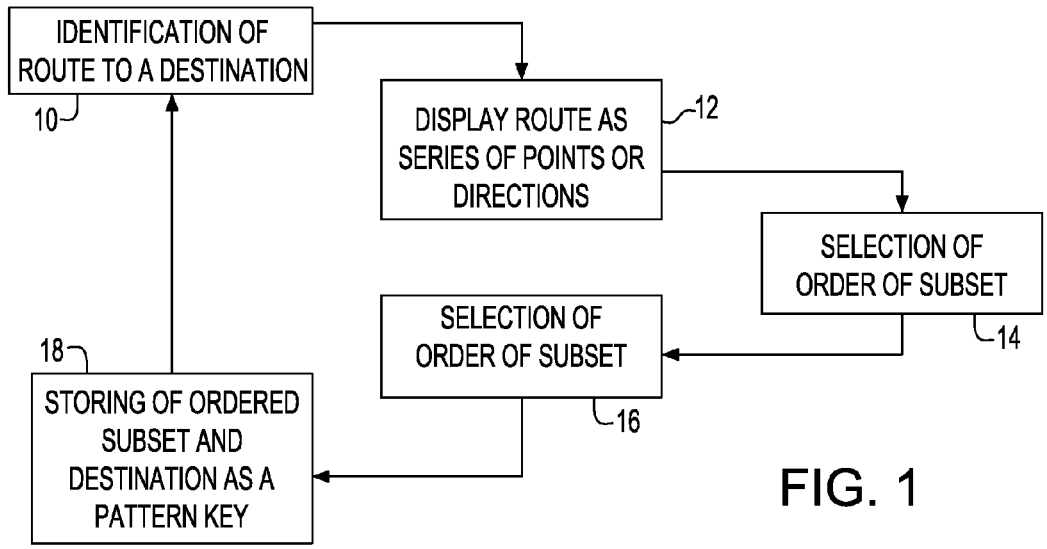
FIG. 1 shows a one-time configuration process of the present invention.

A GPS comprises GPS receivers owned by users, Satellites orbiting the Earth, and control and monitoring stations on Earth. Currently commercially available GPS satellite based systems are Magellan®, Garmin®, JVC®, Averatec®, Navman®, Tom Tom®, etc.

In one embodiment of the invention, during a configuration process, a GPS-based navigation system allows a user to specify a journey, possible by entering a starting point and a destination. This configuration process, i.e., entry of vehicle route information, may be a one-time initial process, which the user would perform; for example, on receiving the system. Once the system is configured with routes, when a vehicle is embarking on a journey, a driver need not enter the destination, or any other information, for the system is able to automatically predict the destination. Therefore, the system does not require a human accessible interface, after the configuration process. After the user enters the starting point and the destination, a route is displayed (either as a map or a list) to the user as a series of decision points (i.e. turn left, straight over the roundabout etc.) The user can then manually select the smallest subset of these points, as close to the starting point as possible, that would uniquely identify for the user that the vehicle is embarking on the route to the specified destination. The subset should be selected as much as possible from points as close to the start point as possible, rather than including points close to the destination. The system then stores the subset of points and the final destination as a pattern key for the route. The pattern key uniquely identifies the route from the starting point to the destination. This can be repeated for as many routes as required. In this embodiment, the pattern key means a subset of all the directions required to get from a staring point to the destination. For example, a pattern key for a journey to a supermarket might be:

(a) Destination: Supermarket
  1. turning right at a particular junction
  2. going straight on at a particular roundabout
  3. turning left into a certain street These three directions with the destination represent the pattern key on a route to the Supermarket. If a vehicle passes through all 3 of theses points in order, then it can be taken that the vehicle is heading to the Supermarket.

During a destination determination process, while the vehicle is traveling to a destination, the system constantly compares its own location to the first point in all the known pattern keys based on a GPS-based navigation system. If any of these points are passed through, then for the pattern keys, the system searches for the next points. If all locations of a route's pattern key are passed through in the defined order, the system concludes that a known route has been embarked on, and so the final destination can be determined.

Therefore, once the system has been preconfigured with all the routes of interest, the end destination does not need to be entered, which makes it suitable for autonomous systems.

Reference is now had to FIG. 1, which shows a flow chart of a one-time configuration process. At step 10, a user identifies a route from a first point to an end point by entering a starting point and a destination in a navigation system. Then, at step 12, the system displays a route via a displayed map with a series of decision points or via a displayed media list with a series of decision points. At step 14, the user manually selects a smallest subset of the decision points (as early in the directions as possible) to identify a vehicle's movement as having embarked on a route to the destination. At step 16, the user sets the order that a vehicle may pass through the subset. For example, if the user selects the subset including A, B, and C, the order of subset may be A→B →C (passing A at first, passing B at second, and passing C at last). At step 18, the system stores the ordered subset and the destination as pattern key for the route. The user defines an order of the pattern key. This process is repeated as many times as required to enter potentially many routes for a user.

Figure 2:
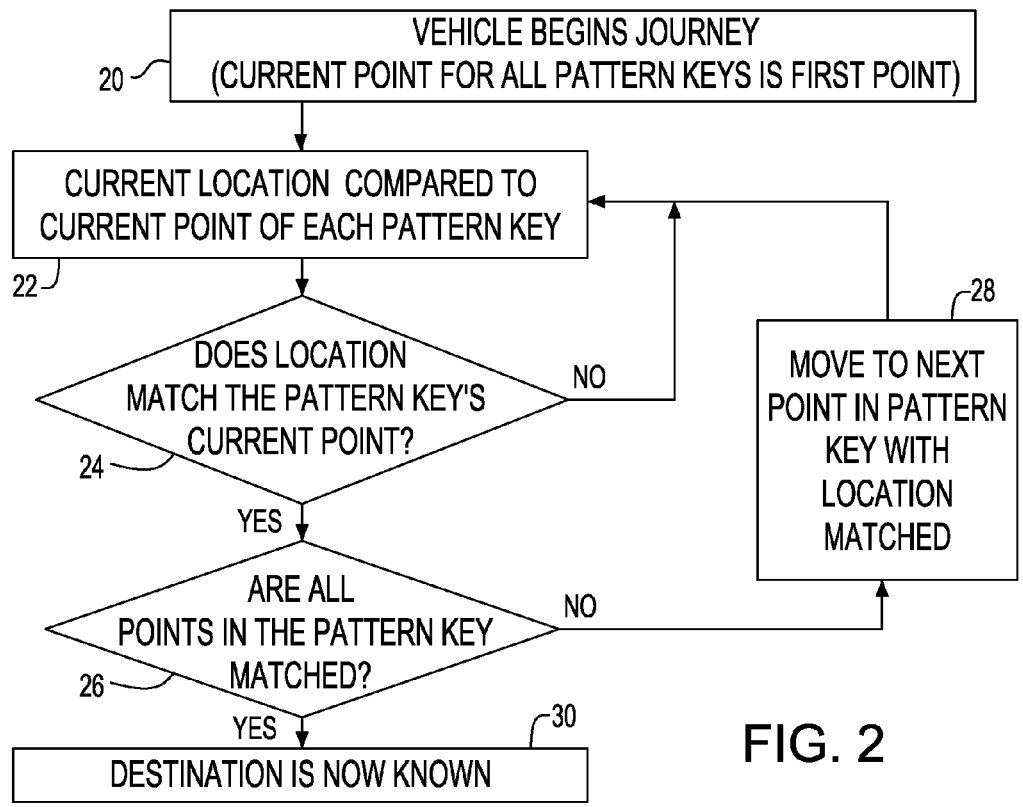
FIG. 2 shows a destination determination process of the present invention.

FIG. 2 shows a dynamic destination determination process activated as the vehicle embarks on a route to a destination. At step 20, a user starts to drive a vehicle. First points in pattern keys are set as current points in the pattern keys. At step 22, the vehicle's current location is compared to each current point of each pattern key based on a GPS-based navigation system. At step 24, if it is determined that the vehicle's current location does not match with current point of any pattern key, the system returns to step 22. If it is determined that the vehicle's current location matches with a current point of at least one pattern key, at step 26, the system checks if the vehicle passes through all locations of these pattern keys in defined order. If the vehicle passed through all locations of a pattern key in defined order, at step 30, the pattern key destination can be predicted as vehicle's destination. For the pattern keys that have just matched with the vehicle's current location in step 24, if the vehicle has not passed through all location of a pattern key, at step 28, the system sets the current point in the pattern key to the next point in the pattern key. Then, system returns to step 22.

The following illustrates an example of the destination determination process. In the example, it is assumed that:
Pattern key 1: A→B→C→Destination1
Pattern key 2: S→T→U→V→Destination2
Now, referring to the steps described with respect to FIG. 2,
At step 20, a car starts to move. A is set as a current point in the pattern key 1. S is set as a current point in the pattern key 2.

At step 22, a navigation system compares the car's current location to the current point in each pattern key (i.e. points A and S are compared to vehicles current location)

At step 24, if the system finds out there is no match between the car's current location and current points in pattern keys, system continues to compare current location to current point in each pattern key by repeating step 22.

After a while, the car's current location becomes A.

The system compares the car's current location to the current point in each pattern key (i.e. points A and S) (Step 22) and the car's current location is found to match with the current point of pattern key 1 (i.e. point A) (Step 24).

At step 26, all points in matched pattern key (pattern key 1) are checked and found that not all points are matched.

At step 28, the current point in pattern key 1 moved to next point (i.e. B now becomes the current point for pattern key 1)

System returns to comparing the car's current location with current points of all pattern keys (22) (i.e. points B and S are compared to vehicles current location)

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art

What is claimed is:

1. A method to autonomously determine a destination of a vehicle employing a GPS-based navigation system comprising: a one-time configuration process and a destination determination process, said one-time configuration process comprising:

(a) inputting one or more routes to be autonomously determined in said system, each route including a starting point and an end point, by entering said starting point and said end point in said GPS-based navigation system;
(b) displaying said route through a map with a series of decision points;
(c) manually selecting a subset of said decision points as close to the starting point as possible to identify a vehicle's movement;
(d) ordering said subset of said decision points;
(e) storing said ordered subset and said end point as a pattern key for said route, said pattern key uniquely identify said route from said starting point to said end point;
(f) repeating (a)-(e) for inputting each route to be autonomously determined;

said destination determination process comprising:

(g) continuously comparing a vehicle's current location with each ordered decision point of each pattern key based on said GPS-based navigation system;
(h) if said vehicle's location matches with said decision points of one or more pattern keys, checking if said vehicle passed through all decision points of said pattern keys;
(i) if said vehicle passed through all decision points of a pattern key in said defined order, said end point of said pattern key is dynamically predicted as said vehicle's destination; and
(j) returning to step (g).

2. The method according to claim 1 further comprising:
(k) displaying said route through a list with said series of decision points.

* * * * *